United States Patent [19]
Wright

[11] 3,719,614
[45] March 6, 1973

[54] PROCESS OF MAKING FOAM RUBBER, AND THE FOAM RUBBER THUS PRODUCED

[75] Inventor: Sam W. Wright, Calhoun, Ga.

[73] Assignee: The Firestone Tire and Rubber Co., Akron, Ohio

[22] Filed: March 19, 1971

[21] Appl. No.: 126,253

Related U.S. Application Data

[63] Continuation-in-part of Ser. No. 42,552, June 1, 1970, abandoned.

[52] U.S. Cl. ............260/2.5 L, 161/159, 260/2.5 H, 260/5, 260/2.5 HB, 260/29.7 P, 260/723, 260/815, 260/821
[51] Int. Cl......C08f 47/08, C08c 17/08, C08d 13/08
[58] Field of Search...........260/2.5 L, 2.5 AJ, 29.7 P, 260/29.6 MP, 723, 50

[56] References Cited

UNITED STATES PATENTS

| | | | |
|---|---|---|---|
| 2,582,181 | 1/1952 | Truhlar et al. | 260/29.7 P |
| 3,015,854 | 1/1962 | McClure | 260/2.5 L |
| 3,423,343 | 1/1969 | Barnett | 260/2.5 AJ |
| 3,562,197 | 2/1971 | Sears et al. | 260/29.6 MP |

*Primary Examiner*—John C. Bleutge
*Assistant Examiner*—Wilbert J. Briggs, Sr.
*Attorney*—S. M. Clark and Gordon B. Seward

[57] ABSTRACT

Foam rubber is produced by foaming an aqueous polymer latex containing at least 0.05 percent by weight zinc oxide, based on the polymer, and from 0.2 to 5.0 percent by weight ammonium polyphosphate, based on the polymer; then heating the foam to solidify and dry it. The ammonium polyphosphate can be the sole gellant; or a soluble ammonium salt gellant can be used in addition. Greater "gel tolerance" results in the latter case.

10 Claims, No Drawings

PROCESS OF MAKING FOAM RUBBER, AND THE FOAM RUBBER THUS PRODUCED

CROSS-REFERENCE TO RELATED APPLICATION

This application is a continuation-in-part of my copending application Ser. No. 42,552, filed June 1, 1970 and now abandoned, entitled PROCESS OF MAKING FOAM RUBBER, AND THE FOAM RUBBER THUS PRODUCED.

BACKGROUND OF THE INVENTION

This invention relates to a process of manufacturing foam rubber, optionally in combination with a backing of fabric or the like.

The process of manufacturing a porous, cellular cushioning material from an elastomer latex has always centered upon a means for gelling the material. Latex starting materials have been used which were based on natural rubber, SBR, polychloroprene, polystyrene, NBR, as well as combinations of latices based on these elastomers. All these latices are dispersions of rubber particles in water, and remain somewhat fluid after being foamed. The process of converting the fluid foam into a solid, preparatory to vulcanization and drying, is referred to generally as gelling.

A number of methods for gelling foam have been developed and used widely. Disregarding the Talalay or "frozen-foam" process, these methods may be classified as either "timed" or "heat-sensitive" systems. The timed system is exemplified by the use of a hydrolyzable material such as sodium silicofluoride, which produces foam gellation by a controlled hydrolysis, reducing the pH of the foam, and thereby destabilizing the dispersion of elastomer in water to produce a solid foam.

Of increasing interest recently are the "heat-sensitive" gelling systems, which rely on the solubilizing of zinc oxide to convert sodium or potassium soaps to insoluble zinc soaps, thereby effecting gellation. Ammonium salts such as sulfates, nitrates, and especially acetates, effectively produce this type of gelling in combination with zinc oxide, and their use is well known. These salts are all relatively quite soluble in water, and their action is very dependent on temperature, hence the term "heat-sensitive", as applied to gelling systems which use them.

In the use of either of these gelling systems described, certain precautions must be taken. The gelling agent, whether a silicofluoride or a soluble ammonium salt, must be added to the foam just before it is shaped, by molding or scraping, or harmful results occur. Any of the known gellants have a destructive effect on the latex system if left in for an extended length of time, and will eventually cause gelling or coagulation unless their addition is delayed until the last moment. It is usually necessary to avoid adding any of the known gelling agents to the latex before the foaming step, since their effect on the soaps present can impair the foaming qualities of the latex mixture.

Addition of the gelling agent to the latex mixture after foaming, but before the foam is shaped presents a number of problems and difficulties. The gelling agent must be pumped and metered into the viscous foam using a separate system, and then mixed thoroughly to insure even gelling. Either too much or too little gellant has a harmful effect on the structure of the foam, and on the quality of the finished product. And an uneven distribution of gellant in the foam can produce local areas containing essentially no gellant, and a resultant total loss of the porous structure required in that area.

The limitations of the existing systems thus necessitate expensive pumping, metering, and mixing equipment, as well as constant attention to the rate of flow of the gellant into the foam, in order to maintain adequate product quality.

SUMMARY OF THE INVENTION

It has now been found that the problems of the existing gelling systems can be eliminated by the use of ammonium polyphosphate as a gelling agent in latex foam.

Ammonium polyphosphate is a material recently developed as a fire-retardant, and sold under the registered trademark "PHOS-CHEK P/30." Its use in paints is recommended to produce so-called "intumescent coatings," that is, those coatings which retard the propagation of fire by bubbling or foaming on exposure to high temperatures. The coating thus becomes a multicellular insulative foam and protects the substrate.

Since it was recommended for use as a fire retardant only, the effectiveness of ammonium polyphosphate as a gelling agent in latex foam was totally unexpected. However, it was accidentally discovered that from 0.2 to 5.0 parts by weight of ammonium polyphosphate based on 100 parts of polymer solids in the latex, produces a compound which is capable of extended storage, yet permits normal foaming and produces an excellent gelled foam on exposure to heat. The presence of at least 0.5 parts by weight of zinc oxide per 100 parts of polymer is also required. The ammonium polyphosphate can be introduced into the latex compound along with the other ingredients, and need not be added separately after foaming. In fact, latex compounds containing ammonium polyphosphate have remained stable in storage for several weeks.

While the use of ammonium polyphosphate at the recommended level of from 0.2 to 5.0 percent gives a latex foam system which will gel without additional gelling agents, lower levels of the ammonium polyphosphate, such as from 0.05 to 1.0 per cent can be used, along with a soluble ammonium salt gellant. In this way a foam compound having an unusually high "gel tolerance" can be made.

DESCRIPTION OF THE PREFERRED EMBODIMENTS

The elastomer latices employed in the process of the invention are broadly described as aqueous dispersions of natural or synthetic rubber. By synthetic rubber is meant homopolymers of butadiene or isoprene; copolymers of butadiene and styrene, butadiene and acrylonitrile, isoprene and styrene, copolymers of butadiene, styrene, and an unsaturated carboxylic acid; and chloroprene homopolymers. Preferred are natural latex and the emulsion-polymerized copolymer latices of butadiene and styrene (SBR latices), or blends of these two latices.

The preferred gelling agent of the invention is sold under the trademark "PHOS-CHEK P/30," and is defined as "water-insoluble polymeric nitrogenous phosphate" by the manufacturer. The exact chemical composition of the material is not revealed by the manufacturer; only that it contains, typically, 32 percent phosphorous. The solubility of ammonium polyphosphate in water is reported as quite low (about 1 gram in 100 grams of water) as compared to that of monoammonium phosphate (about 41 grams in 100 grams of water). For convenience, the material will be referred to as "ammonium polyphosphate." In the process of the invention, ammonium polyphosphate is used in an amount of from 0.05 to 5.0 weight percent, based on the weight of the polymer.

If desired, a soluble ammonium-salt gellant can also be employed, although the process will work well using ammonium polyphosphate as the sole gelling agent. Such soluble ammonium-salt gellants as ammonium acetate, nitrate, or sulfate, or monoammonium phosphate can be used, in amounts from about 0.5 to 5.0 parts by weight per 100 parts of polymer. Ammonium acetate is preferred. The soluble ammonium-salt gellants are used in water solution, and the solution pH should be buffered to a value of from 7 to 11, preferably with ammonia. When a soluble ammonium-salt gellant is used, a reduced amount of ammonium polyphosphate should be used, in the range of from 0.05 to 1.0 percent, based on the polymer.

The presence of zinc oxide in the latex mixture prior to foaming is required for the proper practice of the invention. Zinc oxide is added normally in most processes for producing latex foam, and is prepared in the form of a dispersion, according to known methods. At least 0.5 percent zinc oxide by weight, based on the polymer, is required, up to 10 percent, or more. From 2 to 6 percent is normally preferred and no special advantage is found with higher levels.

The process of the invention is particularly suited to the production of foam rubber for rug or carpet cushioning, which is attached either to the carpet back or to a fabric substrate as a separate pad. This foam rubber is characterized by a relatively thin gauge (or thickness) and a high level of filler, and is usually made in continuous lengths, and widths up to 15 feet.

The latices employed are stabilized primarily by anionic surfactants. Natural latex contains natural soaps and proteinaceous stabilizers which keep the rubber particles in suspension in water. The synthetic latices used in the process are similarly stabilized with anionic surfactants, such as alkali metal salts of fatty acids and rosin acids, or synthetic anionic detergents. For purposes of protective stabilization and to promote rapid foaming, additional soaps and surfactants are added, such as potassium oleate, and tetrapotassium pyrophosphate. Strong bases such as ammonia or potassium hydroxide are used also, to maintain the pH of the latex compound in the area of 11–12.

For cost reduction, fillers, such as clay, whiting, talc, feldspar, or hydrated alumina are used. The use of such materials is well known, and levels are relatively high — from 75 to 200 parts of filler by weight per 100 parts of latex solids. The fillers may be added to the latex in the form of an aqueous dispersion or slurry, or they may be added dry, with agitation, to the properly stabilized latex.

Known vulcanizing systems can be employed in the process, when vulcanization is desired, and sulfur and ultra accelerators are preferably added to the latex in the form of aqueous dispersions. The dispersions may be ball-milled or colloid milled, and can be stabilized as is well known in the art. Copolymers containing a carboxylic acid can be used without a vulcanizing system. An antioxidant should be added to insure against deterioration of the foam during service. Any of a variety of commercial antioxidants can be used.

The use of sensitizers in gelling foam rubber is well known, and their use is recommended in the instant invention. Such materials as "Arquad-12" (a quaternary amine salt) and "Trimene Base" (a reaction product of formaldehyde, ammonia and ethyl chloride) can be used. These materials assist in the gelling reaction, and insure that the cellular structure is maintained.

Thickeners are sometimes used in latex foam compounds in order to preclude settling out of fillers or other particulate solids, and to prevent collapse of the cell structure of the foam during gelling. Any of a number of synthetic or natural materials, such as sodium polyacrylate, carboxymethylcellulose, or karaya gum can be used if desired.

The total solids content of the foam compound is usually kept between about 50 and 80 percent. The solids content should be as high as possible to give good gelling characteristics, and yet not so high as to give too viscous a compound, and impair foaming characteristics. When the foam is to be gelled, vulcanized and dried in a single continuous operation, use of maximum possible solids content improves the rate of production by requiring a minimum of water removal in the oven. For this reason, compounds are generally at least 70 percent solids when designed for this type of production.

Foaming is usually done by mechanical beating of air into the latex compound, and usually in a continuous foamer. The latex compound and air are metered into a zone of high-shear agitation, and a smooth foam of the desired density is continuously produced. For carpet-padding applications, the foam is spread on a moving sheet of fabric which is then passed through a hot-air oven to accomplish gelling, vulcanizing and drying in a single operation. The thickness of the foam is limited to a maximum of about 13 mm., for heat transfer reasons, and oven temperatures of from 100° to 200° C. are used. The use of dielectric heating is recommended for thicknesses in excess of about 13 mm., whereby the entire mass of foam is subjected to a high-frequency oscillating current of electricity.

While foam rubber is often molded to produce pillows, mattresses and various shapes and sizes of cushions, the thicker cross-sections used in molded pieces make a heat-sensitive gelling system less practical. When used in an oven-drying system as described above, the heat-sensitive gelling method becomes more practical because of the relatively thin cross-sections employed.

Molded foam rubber articles which have sections less than 1 inch thick can also be made, however, employing the process of the invention. In certain operations it is desired to have a foamed compound with substantial "pot life," which will gell after being injected into a hot mold. Ideally, the foam compound containing a heat-sensitive gellant should remain stable (without premature gelling or foam collapse) for an hour at room temperatures. It has been found possible to approach this ideal behavior using the process of the invention.

In the molded foam application described above the foam is not supported on a fabric or textile base, and thus is required to be stronger and more tear-resistant. For this reason, the fillers are usually omitted, and the proportion of natural latex is increased. The solids content of the foam compound should be somewhat lower, as well, between about 55 and 65 percent by weight.

The process of the invention, which has been generally described, can be understood in greater detail by reference to the following examples, depicting specific modes of using the process. Unless otherwise stated, all percentages are by weight, and all formulations are calculated based on 100 parts of solids contained in the elastomer latices used.

EXAMPLE I

In the course of investigating fire-retardants for latex foam a latex compound was mixed according to the following formulation:

| Total Solids | Ingredient | Parts by Weight Dry | Wet |
|---|---|---|---|
| A. | | | |
| 72 | FRS 258 Latex[1] | 60.00 | 83.33 |
| 20 | K-Oleate | 1.50 | 7.50 |
| 62 | X-2-B Natural Latex[2] | 40.00 | 64.51 |
| 50 | Antioxidant | 1.50 | 3.00 |
| 50 | Trimene Base | 1.00 | 2.00 |
| 05 | Tetrasodium Pyrophosphate | .50 | 10.00 |
| 28 | Ammonia | – | 4.00 |
| 100 | Hydrated Alumina | 125.00 | 125.00 |
| | | 229.50 | 299.34 |
| B. | | | |
| 50 | Zinc Oxide | 5.00 | 10.00 |
| 50 | Sulfur | 1.50 | 3.00 |
| 50 | E. Zimate[3] | .75 | 1.50 |
| 50 | B. Zimate[3] | .50 | 1.00 |
| 50 | Zenite Special[3] | 1.50 | 3.00 |
| | | 9.25 | 18.50 |
| | Total Finished Compound: | 238.75 | 317.84 |

1. An SBR latex, designed for foam
2. A centrifuged, "low-ammonia" natural latex.
3. Ultra accelerators The ingredients under portion A were combined in the order shown, with agitation. The ingredients under portion B were combined and all of portion B was added to portion A, with agitation, to form the finished latex compound.

After foaming this compound in a laboratory mixer to add approximately six volumes of air to the latex, a separately prepared mixture of 0.30 parts of ammonium polyphosphate and 10.0 parts of a 12.5 percent solution of ammonium acetate was mixed into the foam. The foam was spread to a thickness of about 5mm. and placed in a hot air oven for about 20 minutes at about 170° C. The resultant material was a smooth, soft sheet of foam rubber about 5 mm. thick, suitable for carpet-padding applications.

It was noticed that the inclusion of the ammonium polyphosphate affected the gelling behavior of the foam, as compared with the use of ammonium acetate (the normal gelling agent) alone. Accordingly, further trials were made to evaluate the effect of the ammonium polyphosphate on the gelling behavior of the foam.

EXAMPLE II

In a similar manner as in Example I, a latex compound was mixed according to the following formulation:

| Total Solids | Ingredient | Parts by Weight Dry | Wet |
|---|---|---|---|
| 73.4 | FRS 258 Latex | 70.00 | 95.37 |
| 20 | K-Oleate | .50 | 2.50 |
| 50 | Trimene Base | 1.00 | 2.00 |
| 62 | X-2-B Natural Latex | 30.00 | 48.39 |
| 40 | Antioxidant | 1.50 | 3.75 |
| 20 | K-Oleate | 1.50 | 7.50 |
| 10 | Tetrapotassium Pyrophosphate | .75 | 7.50 |
| – | Ammonia | – | 4.00 |
| 100 | Ammonium Polyphosphate | 2.10 | 2.10 |
| 20 | KOH | .20 | 1.00 |
| 100 | Hydrated Alumina | 125.00 | 125.00 |
| 50 | Zinc Oxide | 5.00 | 10.00 |
| 50 | Sulfur | 1.50 | 3.00 |
| 50 | Ethyl Zimate | .75 | 1.50 |
| 50 | Butyl Zimate | .50 | 1.00 |
| 50 | Zenite Special | 1.50 | 3.00 |
| | | 241.80 | 317.61 |

All the ingredients were combined in the order listed, with agitation.

This latex compound was foamed in a laboratory mixer as in Example I, except that no ammonium acetate gellant was added. The foam was spread and placed in an oven as before, and was solidified and dried into a sheet of foam rubber having good properties for padding applications. A good cell structure was obtained, indicating that adequate gelling action had taken place, despite the omission of the standard ammonium acetate gellant.

EXAMPLE III

A latex compound was produced according to the same formulation and procedure as outlined in Example II, except that the ammonium polyphosphate was omitted. On foaming, spreading and heating as before, a very poor-appearing piece of foam was obtained, which exhibited a thick, cracked skin, and large irregular cell structure. The thickness of the foam was considerably less than that produced in the two previous examples.

EXAMPLE IV

In a similar manner as Example II, a latex compound was prepared according to the following formulation:

| Total Solids | Ingredient | Parts by Weight Dry | Wet |
|---|---|---|---|
| 64 | FRS 2105 Latex[4] | 50.00 | 78.00 |
| 72.6 | FRS 258 Latex[4] | 20.00 | 27.50 |
| 51.5 | FRS 257 Latex[5] | 10.00 | 19.50 |
| 62 | X-2-B Natural Latex | 20.00 | 32.20 |
| 15 | K-Oleate | 4.25 | 28.00 |
| 40 | Antioxidant | 1.50 | 3.75 |
| – | Ammonia | – | 7.00 |
| 50 | Trimene Base | 1.00 | 2.00 |
| 10 | Tetrapotassium Pyrophosphate | 0.75 | 7.50 |
| 20 | KOH | 0.20 | 1.00 |
| 100 | Ammonium polyphosphate | 3.00 | 3.00 |
| 100 | Hydrated Alumina | 125.00 | 125.00 |
| 50 | Zinc Oxide | 4.50 | 9.00 |

| | | | |
|---|---|---|---|
| 50 | Sulfur | 1.30 | 2.60 |
| 50 | Ethyl Zimate | 0.70 | 1.40 |
| 50 | Butyl Zimate | 0.45 | 0.90 |
| 50 | Zenite Special | 1.30 | 2.60 |
| | | 243.95 | 351.05 |

4. A cold-polymerized, high-solids SBR latex.
5. A carboxylated SBR latex.

In order to determine the storage stability of this latex compound, especially the effect of storage on foamability, foam rubber samples were produced (as in Example II) over a period of several weeks. The time required to foam the latex compound to a density of 350 gm/liter was recorded in each case. The results are summarized in the table below:

| Latex Compound Age, in Days | Foaming Time, Seconds | Foam Quality |
|---|---|---|
| 0 | 40 | Good |
| 12 | 56 | Good |
| 14 | 60 | Good |
| 19 | 47 | Good |
| 39 | 70 | Good |

EXAMPLE V

A latex compound is prepared in a similar manner as in Example IV, except that the ammonium polyphosphate is omitted. On addition of 10 parts by weight of a 12.5 percent solution of ammonium acetate, the latex compound is coagulated within 24 hours. Thus, storage stability of latex compounds containing ammonium acetate is severely deficient, and such compounds are unfit for commercial use, where stability in storage is a necessity.

EXAMPLE VI

For producing a molded foam article, a compound was made according to the following recipe:

| Total Solids | Ingredient | Parts by Weight Dry | Wet |
|---|---|---|---|
| 62 | X-2B Natural Latex | 60.00 | 96.77 |
| 15 | K-Oleate | 0.85 | 5.67 |
| 72.6 | FRS 258 Latex | 40.00 | 55.00 |
| 40 | Antioxidant | 1.50 | 3.75 |
| 50 | Ethyl Zimate | 1.00 | 2.00 |
| 50 | Zenite Special | 1.50 | 3.00 |
| 50 | Sulfur | 2.00 | 4.00 |
| 50 | Trimene base | 1.00 | 2.00 |
| – | Water | – | 7.56 |
| 60 | Total | 107.85 | 179.75 |

After foaming the following materials were added:

| | | | |
|---|---|---|---|
| 50 | Zinc Oxide | 4.50 | 9.00 |
| 30 | Ammonium Polyphosphate | 0.85 | 2.83 |

The foam was then held at room temperature (25°C.) for 30 minutes, then injected into a hot (80°C.) mold. The foam was vulcanized for 15 minutes at 100°C. and showed a good skin structure.

EXAMPLE VII

A latex compound identical to that shown in Example I was prepared. To this compound was added a slurry of ammonium polyphosphate made from the following recipe:

| MATERIAL | DRY | WET |
|---|---|---|
| Ammonium Polyphosphate | 0.325 | 0.325 |
| Tetrapotassium Pyrophosphate | 0.110 | 0.110 |
| KOH | 0.070 | 0.070 |
| Water | – | 1.200 |
| Total | 0.505 | 1.705 |

Portions of the resulting mixture were foamed in a laboratory foamer, and a 12 percent solution of ammonium acetate was added, in varying amounts, as a gellant. As in Example I, the foam was spread, and cured and dried at 170°C. It was found that good quality foam could be produced even though the quantity of ammonium acetate solution employed was varied from four grams to forty grams per hundred grams of polymer solids.

The foregoing examples show that a good quality foam rubber product can be produced using ammonium polyphosphate either as the sole gelling agent or along with other gelling agents, and that latex compounds containing ammonium polyphosphate retain their properties during extended storage.

I claim:

1. The process of producing a porous cellular material from an aqueous natural rubber latex or latex from a homopolymer or copolymer of diene monomer by the steps of foaming the latex which contains at least 0.5 percent by weight zinc oxide based on the polymer and from 0.05 to 5.0 percent by weight ammonium polyphosphate based on the polymer, the ammonium polyphosphate being essentially water-insoluble, and heating the resultant foam to solidify and dry said foam.

2. The process of claim 1, wherein the ammonium polyphosphate is the sole gelling agent, and is present in an amount of from 0.2 to 5.0 percent, based on the polymer.

3. The process of claim 1, wherein a soluble ammonium-salt gellant in used, in an amount of from 0.5 to 5.0 percent, and the ammonium polyphosphate is present in an amount of from 0.05 to 1.0 percent based on the polymer.

4. The process of claim 3, wherein the soluble ammonium salt gellant is ammonium acetate.

5. The process of claim 1, wherein the latex is natural latex, SBR latex, or a mixture of the two.

6. The process of claim 2, wherein a vulcanization system is present in the latex before foaming.

7. The process of claim 1, wherein the foam is shaped into a sheet of not more than 13 mm. thickness before heating.

8. The process of claim 1, wherein the foaming step is accomplished by mechanical beating.

9. The process of claim 1, wherein the latex contains from 75 to 200 percent by weight of an inert filler, based on the polymer.

10. The product of the process of claim 1.

* * * * *